Figure 1:
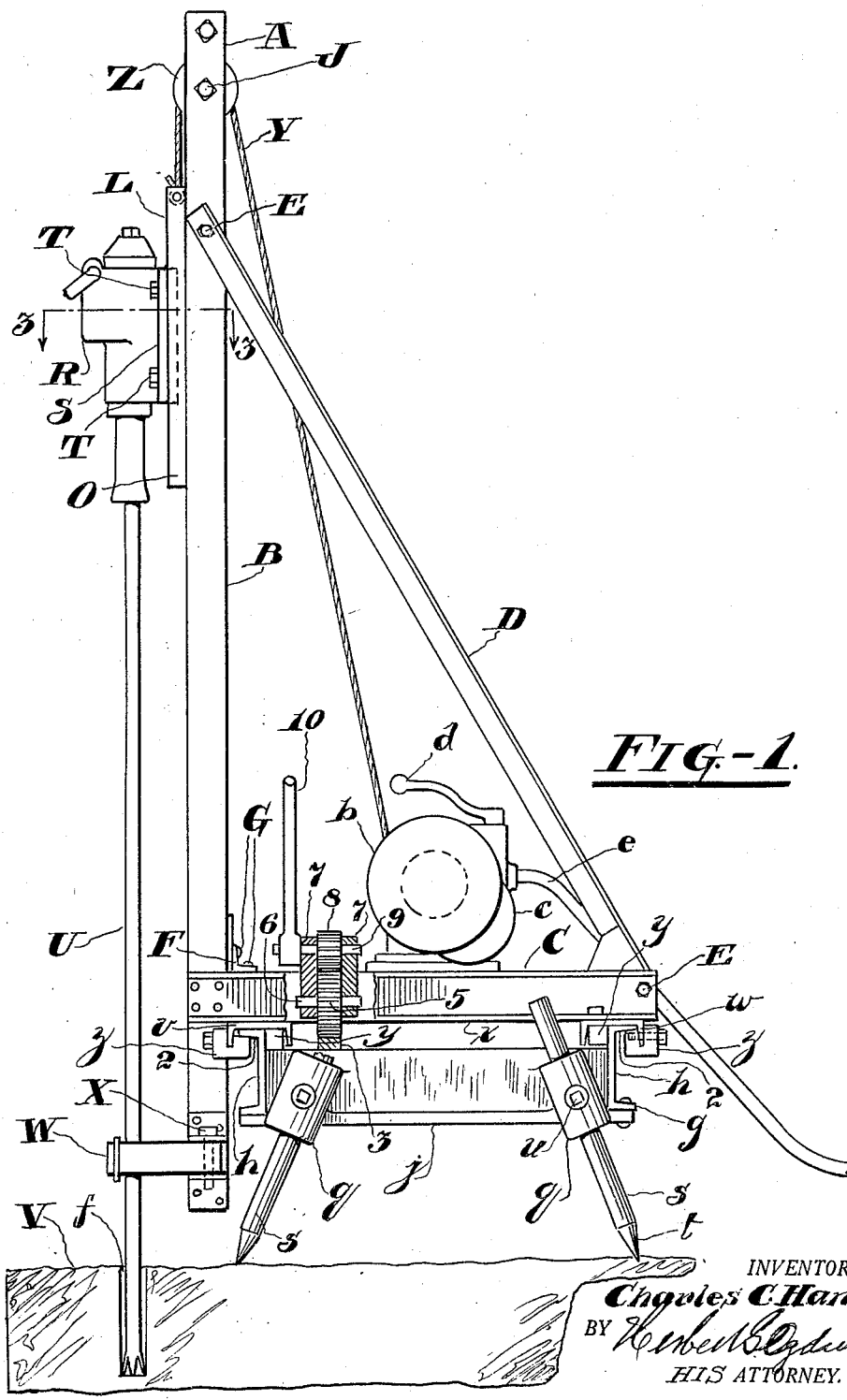

Feb. 18, 1930.   C. C. HANSEN   1,747,869
MOUNTING FOR ROCK DRILLS
Filed Jan. 24, 1927   2 Sheets-Sheet 1

INVENTOR.
Charles C. Hansen
BY
HIS ATTORNEY.

Feb. 18, 1930.  C. C. HANSEN  1,747,869
MOUNTING FOR ROCK DRILLS
Filed Jan. 24, 1927  2 Sheets-Sheet 2
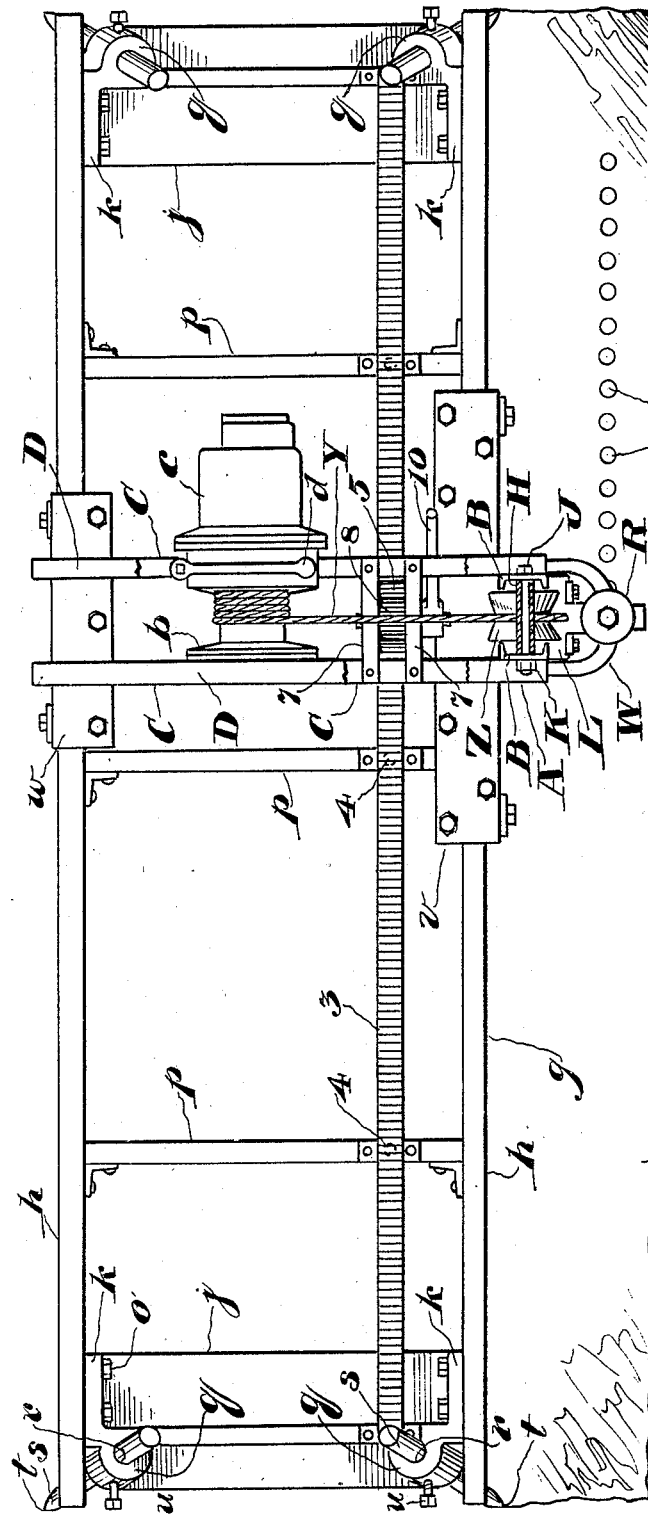
INVENTOR.
Charles C. Hansen
BY Herbert G. Ogden
HIS ATTORNEY.

Patented Feb. 18, 1930

1,747,869

UNITED STATES PATENT OFFICE

CHARLES C. HANSEN, OF EASTON, PENNSYLVANIA, ASSIGNOR TO INGERSOLL-RAND COMPANY, OF JERSEY CITY, NEW JERSEY, A CORPORATION OF NEW JERSEY

MOUNTING FOR ROCK DRILLS

Application filed January 24, 1927. Serial No. 163,164.

This invention relates to mountings, but more particularly to a mounting for fluid actuated rock drills of the type used for drilling and broaching slate, marble and other rock formations which may be readily removed from the mass in the form of blocks of approximately the desired dimensions.

The rock when thus quarried is preferably removed from the quarry in blocks of large dimension in order to hold the expense of handling it to a minimum and also to minimize the expense incident to the setting up of the drilling and broaching apparatus. Heretofore, with the equipment available, it has been found a difficult matter to drill a series of spaced holes of considerable depth without requiring frequent changing of the working implement, it being customary to start the cut with a short steel and substituting steels of greater length and of smaller gauge as the depth of the cut increased. Such changes involve a considerable loss of time and consequently reduce the efficiency of the drilling apparatus. Moreover, since the gauge of the cutting bit decreases with each change of the drill steel this method also acts as a limitation to the diameter of the body portion of the drill steel, so that in diameter, the longer steel, in which the greater rigidity is required, may not exceed that of the starting steels. With these conditions obtaining it happens not infrequently that the cutting bit of the drill steel is deflected somewhat from the desired course, thus rendering it difficult for the broaching tool in the succeeding operation to remove the wall of rock between adjacent drill holes.

It is an object of the present invention to overcome the aforesaid defects as well as to enable the rock drill to be suitably supported at any angle of inclination at which it may be desired to cut the rock.

A further object is to provide a rigid mounting capable of resisting any tendency of the working implement to depart from the desired line of cut and which will remain in a fixed position unaffected by the shocks and vibration of the rock drill.

Other objects will be in part obvious and in part pointed out hereinafter.

The invention consists of the combination of elements, features of construction and arrangement of parts having the general mode of operation substantially as hereinafter described and claimed and illustrated in the accompanying drawings, in which Figure 1 is an end elevation of the mounting, Figue 2 is a plan view, and Figure 3 is a transverse view taken through Figure 1 on the line 3—3 looking in the direction indicated by the arrows.

Referring to the drawings, a drill guide designated generally by A comprises a pair of upright channel members B riveted or otherwise secured near their lowermost ends to a pair of channel members C. The channels C are preferably perpendicular to the channels B and are braced at their outer or free ends by diagonal members D secured at their ends to the channels B and C by bolts E. The channels B together with the attached channels C may be held in suitable spaced relation in any convenient manner, as for instance, by an angle iron F seated in the corners formed by the channels B and C and secured thereto by means of bolts or rivets G.

The upper ends of the channels B are in this instance held in spaced relation by a spacer or pipe H. Through this spacer and through the channels B, is extended a bolt J having a nut K for clamping the channels B firmly against the spacer H. In this way a guide is formed for a drill saddle L consisting in this instance of a pair of symmetrical blocks O adapted to slide on the front face of the outer legs B' of the channels B and a plate P is secured to the blocks O and adapted to slide on the inner faces of the outer legs B'.

In the front face of the blocks O are formed recesses P' to receive guides Q of a rock drill R. In the present instance the guides Q are clamped securely in position in the recesses P' by suitable clamping plates S which overlap the guides Q and are secured fixedly to the blocks O by screws T.

In the front end of the rock drill R is disposed a drill steel U to receive the blows of the hammer piston (not shown). This drill steel in the present instance is guided near the face of the rock V by a steel guide W consisting of a pair of symmetrical members secured pivotally to the channels B by means of pins or bolts X.

Suitable means are provided for expediting withdrawal of the drill steel from the drill hole. To this end a rope or cable Y is secured to the upper ends of the blocks O and passes over a sheave Z supported rotatably between the channels B near their upper ends. The opposite end of the rope Y is wound on the drum $b$ of a fluid actuated hoist $c$ mounted on the channels C and having a throttle lever $d$ for controlling admission of pressure fluid into the hoist $c$, such pressure fluid being conveyed from a suitable source of supply (not shown) by a hose or conduit $e$.

Suitable and convenient means are provided for drilling holes indicated at $f$ parallel with respect to each other, as well as to support the drill guide at any desired angle with respect to the work. To this end is provided a track $g$ comprising in the present instance a pair of parallel rails or channels $h$, both of which lie wholly on one side of the channels B so that the guide overhangs one side of the track $g$. The guide on which the drill is mounted preferably lies closely adjacent the outer side of one of the channels $h$ so that the track may be brought closely to the line of cut and thus avoid a tendency of the apparatus to tilt due to the weight of the overhanging portion and terrific vibration to which the track is subjected by the drill. Between the channels $h$ and preferably near the ends thereof are disposed brackets $j$ having lateral flanges $k$ abutting the inner faces of the channels $h$ to which they are secured by means of bolts $o$. Additional means are provided for bracing the channels $h$ intermediate their ends. Such means in the present instance consist of a plurality of spaced bars or angles $p$ secured to the channels $h$.

As is well known, in operations requiring apparatus of the type to which the present invention pertains, considerable difficulty is frequently experienced in properly supporting the drilling mechanism with respect to the work as well as to set the drilling apparatus at the degree of angularity at which it may be desired to form the cut. To obviate these difficulties each of the brackets $j$ are provided with a pair of diagonal lugs $q$ having suitable apertures $r$ to receive slidably legs $s$. The legs $s$ in this instance have pointed ends $t$ to engage the surface of the rock and thus prevent accidental shifting of the track which might otherwise be caused by the vibrations of the rock drill. Any convenient means may be provided for locking the legs $s$ in the lugs $q$. In the present instance, set screws $u$ are indicated for that purpose.

In order to provide a substantial base for the drill guide, a pair of channels $v$ and $w$ are secured to the lowermost faces $x$ of the channels C. The channel $v$ is secured to the channels C adjacent the upright channels B and the channel $w$ is secured to the free end of the channels C. The channels $v$ and $w$ are so positioned that their outer flanges engage slidably the edges of the upper flanges of the channels $h$, thus preventing relative transverse movement between the drill guide and the track. Additional means are provided for preventing such transverse movement and to this end blocks $y$ are secured to the channels $v$ and $w$ to cooperate slidably with the inner faces of the channels $h$.

To the end that the drill guide may be suitably secured against tilting with respect to the track, a pair of grooved blocks $z$ are screwed on the outer flanges of the channels $v$ and $w$ to cooperate slidably with the inner surfaces 2 of the uppermost legs of the channels $h$.

In order to enable the drill guide, together with the rock drill, to be readily shifted longitudinally of the track $g$, a rack 3 is disposed near one edge of the track $g$ and is supported by the brackets $j$ and the braces $p$ to which it is secured by means of suitable screws 4.

Meshing with the rack 3 is a pinion 5 rotatable on a shaft 6 supported in this instance at its ends by plates 7, said plates in turn being supported by the channels C.

Preferably, a second pinion 8 is provided to mesh with the pinion 5 and this pinion 8 has a shaft 9 which is also supported by the plates 7. The pinion 8 however, is intended to be secured to the shaft 9 so that when said shaft is rotated, such rotation will be transmitted through the pinion 8 to the pinion 5.

Any convenient and well known means may be provided to impart rotative movement to the pinions. Such means in the present instance consist of a rod or lever 10 which may be either fixedly secured to the shaft 9 or may be provided with suitable ratchet mechanism (not shown) to cooperate with the shaft 9 in a well known manner for rotating the pinions.

In the operation of the device, the tracks $g$ may be adjusted to the most suitable elevation and to the desired inclination with respect to the work by merely unscrewing one or more of the set screws $u$ to permit lowering or raising of the track as is necessary to obtain the proper position. After the track $g$ has been thus located the set screws $u$ may again be screwed against the legs $s$ and these set screws will suffice to hold the legs firmly in the lugs $q$ against any jars or shocks to which the track may be subjected.

After the first drill hole has been drilled the rock drill R together with the drill steel U may be readily retracted by manipulating the throttle valve D of the motor $c$ in the direction necessary for winding the rope Y on the drum $b$. In this way the rock drill may be raised upwardly a sufficient distance so that the cutting bit of the drill steel will clear the surface of the rock V. The drill guide, together with the drilling apparatus, may then be conveniently moved to another position by manipulating the rod 10 to rotate the pinions 8 and 5 and thus cause the drill guide to move to the new position, either adjacent the previous drill hole or to any other point within the limits of the track g.

In drilling the rock for broaching purposes however, the drill holes are spaced closely together, leaving only a small or narrow wall of rock between the adjacent holes. After the desired number of holes have been drilled the drill steel U may be removed from the rock drill and a broaching tool substituted therefor.

The function of the broaching tool is to cut away the wall of rock between the drill holes f, and it is therefore essential that the adjacent drill holes should be substantially parallel with respect to each other and also that the broaching tool which follows the drill steel should be advanced along the work in the same path as the drill steel. By means of the present invention, both of these desirable features are made possible and the drill steel which is frequently of a considerable length may be of any suitable diameter which will provide the necessary rigidity to prevent the cutting bit of the drill steel from departing from the desired course of the cut. Another advantageous feature of the present invention is that, owing to the manner in which the drill is disposed with respect to the track, the line of cut may closely approach perpendicular rock faces, thus preventing undesirable ledges or steps of considerable width on the material being broached.

I claim:

A mounting for rock drills, comprising a pair of parallel members of structural shapes forming a track, brackets between the ends of the members for holding said members in spaced relation, braces intermediate the ends of the members for securing said members rigidly together, adjustable legs supporting the track, a guide slidable on the track and perpendicular with respect thereto for guiding a rock drill, said guide overhanging one side of the track and lying closely adjacent the outer side of one of the members, channels carried by the guide and engaging the members to hold the guide against lateral movement with respect to the track, blocks bolted to the channels to prevent tilting of the guide on the track, and manually actuated means for moving the guide longitudinally of the track.

In testimony whereof I have signed this specification.

CHARLES C. HANSEN.